(12) United States Patent
Kunstle

(10) Patent No.: US 7,886,883 B2
(45) Date of Patent: Feb. 15, 2011

(54) TELESCOPIC FORK

(75) Inventor: Reiner Kunstle, Metzingen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 711 days.

(21) Appl. No.: 11/746,308

(22) Filed: May 9, 2007

(65) Prior Publication Data

US 2007/0262557 A1 Nov. 15, 2007

(30) Foreign Application Priority Data

May 13, 2006 (DE) .................. 10 2006 022 473

(51) Int. Cl.
*F16F 9/34* (2006.01)

(52) U.S. Cl. .................. 188/319.2; 188/285; 188/319.1; 188/322.15; 280/276; 280/283

(58) Field of Classification Search ............. 188/282.8, 188/285, 299.1, 316, 319.1, 319.2, 322.15; 280/275, 276, 279, 283
See application file for complete search history.

(56) References Cited

U.S. PATENT DOCUMENTS

| | | | | |
|---|---|---|---|---|
| 3,827,538 A * | 8/1974 | Morgan | ................. | 188/319.1 |
| 5,308,099 A * | 5/1994 | Browning | ................. | 280/276 |
| 5,320,375 A * | 6/1994 | Reeves et al. | ................. | 280/284 |
| 5,456,480 A * | 10/1995 | Turner et al. | ................. | 280/276 |
| 5,478,099 A * | 12/1995 | Kawahara | ................. | 280/276 |
| 6,042,091 A * | 3/2000 | Marzocchi et al. | ................. | 267/64.15 |
| 6,105,988 A * | 8/2000 | Turner et al. | ................. | 280/276 |
| 6,120,049 A * | 9/2000 | Gonzalez et al. | ................. | 280/276 |
| 6,217,049 B1 * | 4/2001 | Becker | ................. | 280/276 |
| 6,457,730 B1 * | 10/2002 | Urbach | ................. | 280/124.161 |
| 6,786,498 B1 * | 9/2004 | Chang | ................. | 280/275 |
| 7,182,358 B2 | 2/2007 | Felsl et al. | | |
| 7,401,800 B2 * | 7/2008 | Jordan | ................. | 280/276 |
| 2006/0202442 A1 | 9/2006 | Felsl et al. | | |

FOREIGN PATENT DOCUMENTS

DE 19953901 7/2001
DE 20306415 10/2003

* cited by examiner

*Primary Examiner*—Robert A Siconolfi
*Assistant Examiner*—Mariano Sy
(74) *Attorney, Agent, or Firm*—Volpe and Koenig, P.C.

(57) ABSTRACT

A telescopic fork (1) for two-wheelers, in particular bicycles, is provided and includes a plunger tube (2) and a fixed tube (3) having a spring element (4), which is impinged by a piston (5) connected to the plunger tube (2), with the piston (5) having a piston rod (6) connected to the plunger tube (2). For adjusting the spring travel, the piston rod (6) is adjustable in height and connected to the plunger tube (2), with an adjustment cylinder (8) being provided for this purpose connected to the plunger tube (2), in which an adjustment piston (9) is guided connected to the piston rod (6) and the cylinder chambers (13, 14) located at both sides of the adjustment piston (9) are filled with fluid and are at least provided with one connecting channel that can be opened and closed for the fluid to flow.

11 Claims, 6 Drawing Sheets

TELESCOPIC FORK

BACKGROUND

The invention relates to a telescopic fork for two-wheelers, in particular bicycles, comprising a plunger tube and a fixed tube with a spring element, impinged by a piston connected to the plunger tube, with the piston having a piston rod connected to the plunger tube.

In such telescopic forks for two-wheelers it is known to change the spring travel in order to adjust for example to the driving style and the ground and/or the line profile, by adjusting the height in the lower area of the piston rod via a thread. The operation occurs manually, for example, via a rotary knob.

Here it is disadvantageous that the adjustment of the spring travel is time consuming and complicated, in particular when frequently readjustments are necessary.

SUMMARY

Therefore the object is to provide a telescopic fork in which the adjustment of the spring travel can be performed quickly, and in an uncomplicated and precise manner.

In order to attain said object the invention essentially provides that the piston rod is connected to the plunger tube adjustably in its height, that for this purpose an adjustment cylinder is provided connected to the plunger tube, in which an adjustment piston is guided connected to the piston rod, and that the cylinder chambers located at both sides of the adjustment piston are filled with fluid and provided with at least one connection channel, that can be opened and closed, for the fluid to flow.

Using this hydraulic device the adjustment piston can easily be positioned in the adjustment cylinder. By opening the connection channel the adjustment piston inside the cylinder can be moved into a desired position, as well as by blocking the connection channel, the piston is blocked in this position. The adjustment of the spring travel can therefore be performed in a particular easy, quick, and precise fashion.

When the connection channel is opened the telescopic fork can be compressed with little force and thus the spring travel can be shortened. In order to set a longer spring travel the telescopic fork is pressed by the spring force to a longer spring travel in the opened connection channel without pressure onto the fork.

It is particularly beneficial when the connection channel penetrates the adjustment piston so that the exchange of fluids can directly occur in the adjustment cylinder without any external connection hoses and the system is less prone to malfunctions and/or is easy maintenance.

In a preferred embodiment, the opening and closing mechanism of the connection channel/channels is realized such that the adjustment piston provided with at least one penetrating bore is rotatable and preferably arranged at both sides of the adjustment piston in a torque-proof manner, with an adjustment disc connected to a holding element, each of which is provided with at least one bore that can be aligned to a penetrating bore in the adjustment piston. When the penetrating bore or bores of the adjustment cylinder is/are aligned to the opening or the openings of the adjustment disks there is a connection between the two cylinder chambers of the adjustment cylinder and the fluid can flow.

According to another advantageous embodiment of the invention the piston rod is connected in a torque-proof manner to the adjustment piston as well as a rotary rod, which extends beyond the upper end of the telescopic leg as well as a rotary control. By turning the rotary rod the adjustment piston can be aligned with its penetrating bore to the respective opening in the adjustment disc. In this manner, by turning the control the adjustment piston can be aligned in reference to the openings of the adjustment discs until flush. In the desired spring position of the telescopic fork, the adjustment piston can then be blocked by closing the connection channels. This means by turning the control or loosening the control in a spring return.

In order to shorten the spring travel, the telescopic fork can be compressed under opened connection channels such that the adjustment piston in the adjustment cylinder moves further downwards and the inserting and the fixed tube are shortened telescopically by the respective adjustment travel of the adjustment piston. In the desired inserted position, the adjustment piston can be blocked by closing the connection channels. When the connection channels are opened by an appropriate operation of the control and no pressure or tension is applied to the telescopic fork the piston moves upward in the adjustment cylinder by the spring force, the inserted section of the plunger and fixed tubes are respectively expanded and the spring travel is therefore lengthened. By the selected spring travel, among other things, an adjustment to the seat position of the rider can be made as well.

In a preferred embodiment the adjustment cylinder is embodied as a closed oil cartridge and thus can easily be assembled and maintained.

The spring element of the telescopic force may comprise one or more springs and/or (spring-) elastomers and/or air and/or fluids.

The device according to the invention can be used in both telescopic legs or only in one telescopic leg and/or in handlebar stem springs and similar spring systems. Here, the device according to the invention may be operated with one spring per rod or with two parallel operating springs in one rod.

BRIEF DESCRIPTION OF THE DRAWINGS

Further details of the invention are explained in greater detail using the exemplary embodiment shown in the drawings. Shown are.

DETAILED DESCRIPTION OF THE PREFERRED EMBODIMENTS

Figure 1:
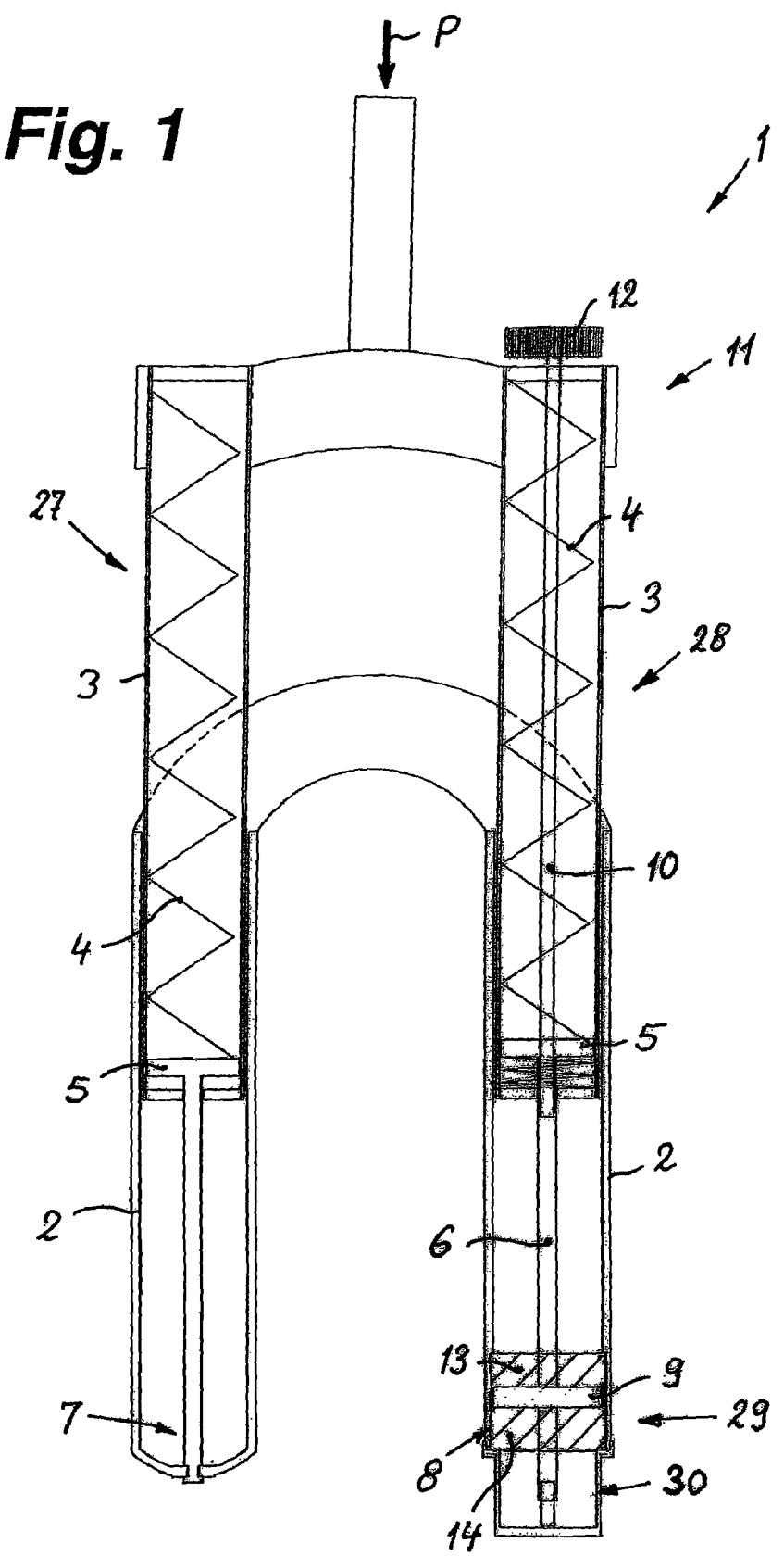
FIG. 1 is a longitudinal cross-sectional view through a telescopic fork according to the invention in a schematic representation.

A telescopic fork, indicated as 1 in its entirety, is shown in FIG. 1 and is provided with two telescopic legs 27, 28 each having an plunger tube 2 and a fixed tube 3 as well as pressure springs 4 located therein, each of which is impinged by a respective piston 5, guided in the respective fixed pipes 3. The pistons 5 are each provided with a piston rod 6 connected at its lower end region 7 with an plunger tube 2.

In order to adjust the spring travel of the fork, one telescopic leg 28 is provided with a spring travel control 29. This control is provided with an adjustment cylinder 8 connected to a plunger tube 2, in which a rotary adjustment piston 9 is guided, connected to the piston rod 6. At both sides of the adjustment piston 9, cylinder chambers 13, 14 are located closed by sealing lids 20, 20a.

The piston rod 6 is connected to the adjustment piston 9 in a torque-proof manner as well as the rotary rod 10, which exceed the upper end 11 of the telescopic leg 28 and has a control 12. By turning the rotary control 12, and thus the adjustment piston 9, a connection channel, not shown in FIG. 1, between the cylinder chamber 13 and the cylinder chamber 14 of the adjustment cylinder 8 can be opened or closed. When the connection channel is opened, the fluid can flow based on a longitudinal displacement of the adjustment piston 9 from the cylinder chamber 13 into the cylinder chamber 14 and/or vice versa. When the connection channel is closed the two cylinder chambers 13 and 14 form fluid-tight chambers. In this manner the adjustment piston 9 can be blocked in its respective lift position.

When the connection channel is opened, the adjustment piston 9 can be pressed downwards by applying a pressure P onto the telescopic fork 1, shortening the spring travel. When the connection channel is open and tension is applied to the telescopic fork 1, the adjustment piston 9 moves upward in the adjustment cylinder 8 and the spring travel is expanded. By closing the connection channel the adjustment piston 9 can be blocked in its respective position.

Figure 2:
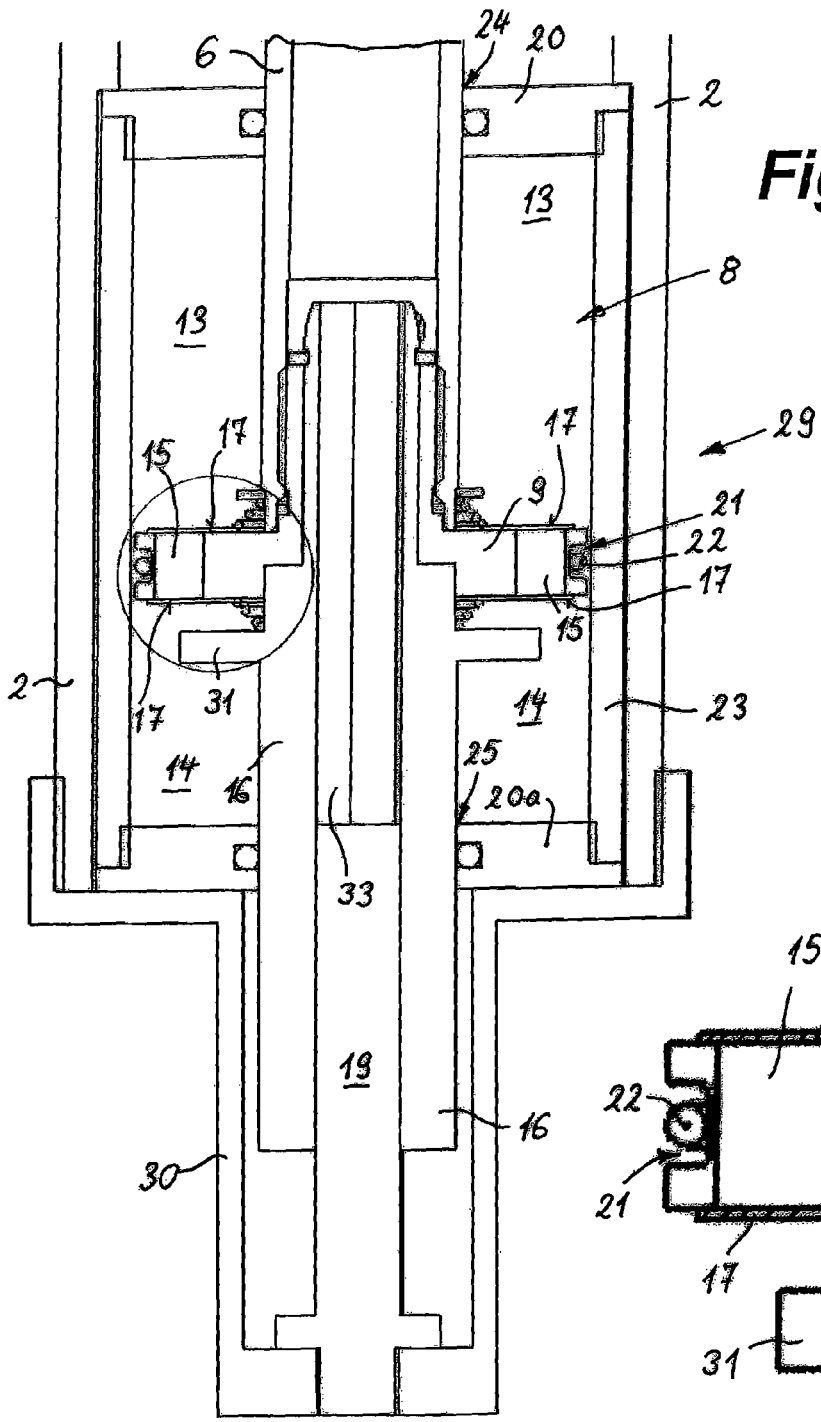
FIG. 2 is a longitudinal cross-section view in the area of an adjustment cylinder with an adjustment piston, adjustment disks, and holding elements in the closed position.

FIG. 2 shows the spring travel adjustment device 29 with the adjustment cylinder 8 and the parts cooperating with it in a cross-section. The rotational adjustment piston 9, longitudinally guided in the adjustment cylinder 8, is connected to the piston rod 9 in a torque-proof manner. As already mentioned, a rotary rod 10 with a rotary control 12 is connected to a piston rod 6 so that the adjustment piston 9 can be rotated by it.

The adjustment piston 9 is provided with two penetrating bores 15 forming the connection channels between the cylinder chamber 13 and the cylinder chamber 14. At both sides of the adjustment piston 9, adjustment disks 17 are arranged connected to a holding element 16 in a torque-proof manner.

In FIG. 2, the adjustment piston 9 is shown in the closed position. Two openings, each penetrating the adjustment discs 17, 18 that can be aligned to the penetrating bores 15 in the adjustment piston 9 (FIG. 4, 5), are not discernible in the closed position shown in FIG. 2.

Figure 3:
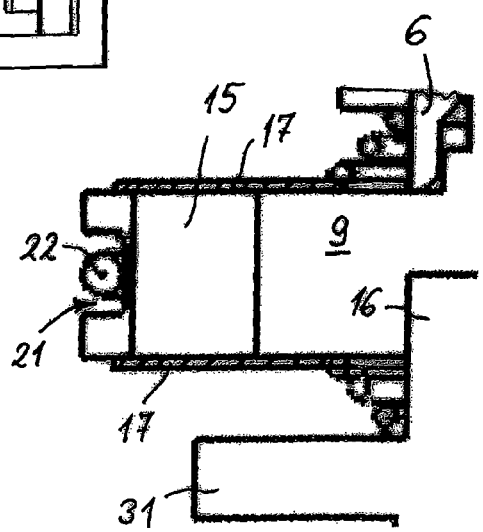
FIG. 3 is a detailed view of the section marked in FIG. 2.

In order to illustrate the closed position, FIG. 3 shows an enlarged detail of FIG. 2. Here it is discernible that the penetrating bores 15 of the adjustment piston 9 are covered in a sealing manner by the adjustment discs 17.

Figures 4, 5:
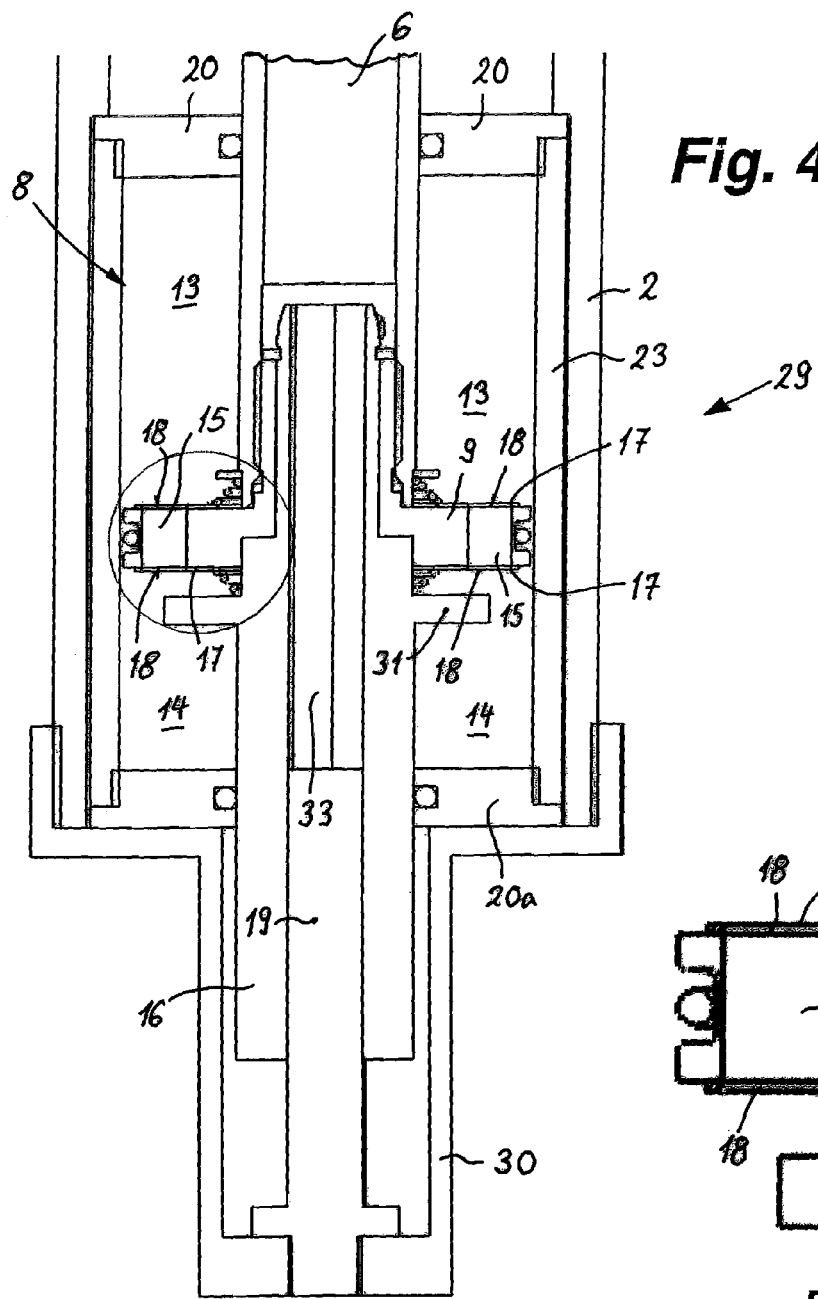
FIG. 4 is a longitudinal cross-sectional view in the area of the adjustment cylinder with an adjustment piston, adjustment disks, and holding element in the open position.
FIG. 5 is a detailed view of the section marked in FIG. 4.

FIGS. 4 and 5 show the adjustment piston 9 in the opened position. As discernible particularly from FIG. 5, the openings 18 of the adjustment discs 17 are located aligned to the penetrating bores 15 of the adjustment piston 9 so that a connecting channel is formed, through which the fluid can flow back and forth in the adjustment cylinder 8 between the cylinder chambers 13, 14. In this way, by turning the adjustment piston 9 in reference to the adjustment discs 17, arranged at the holding element 16 in a torque-proof manner, the connection channels can be opened or closed.

The adjustment discs 17 are impinged by springs towards the adjustment piston 9, and thus contact the flat sides of the adjustment piston 9 in a sealing manner.

Figure 6:
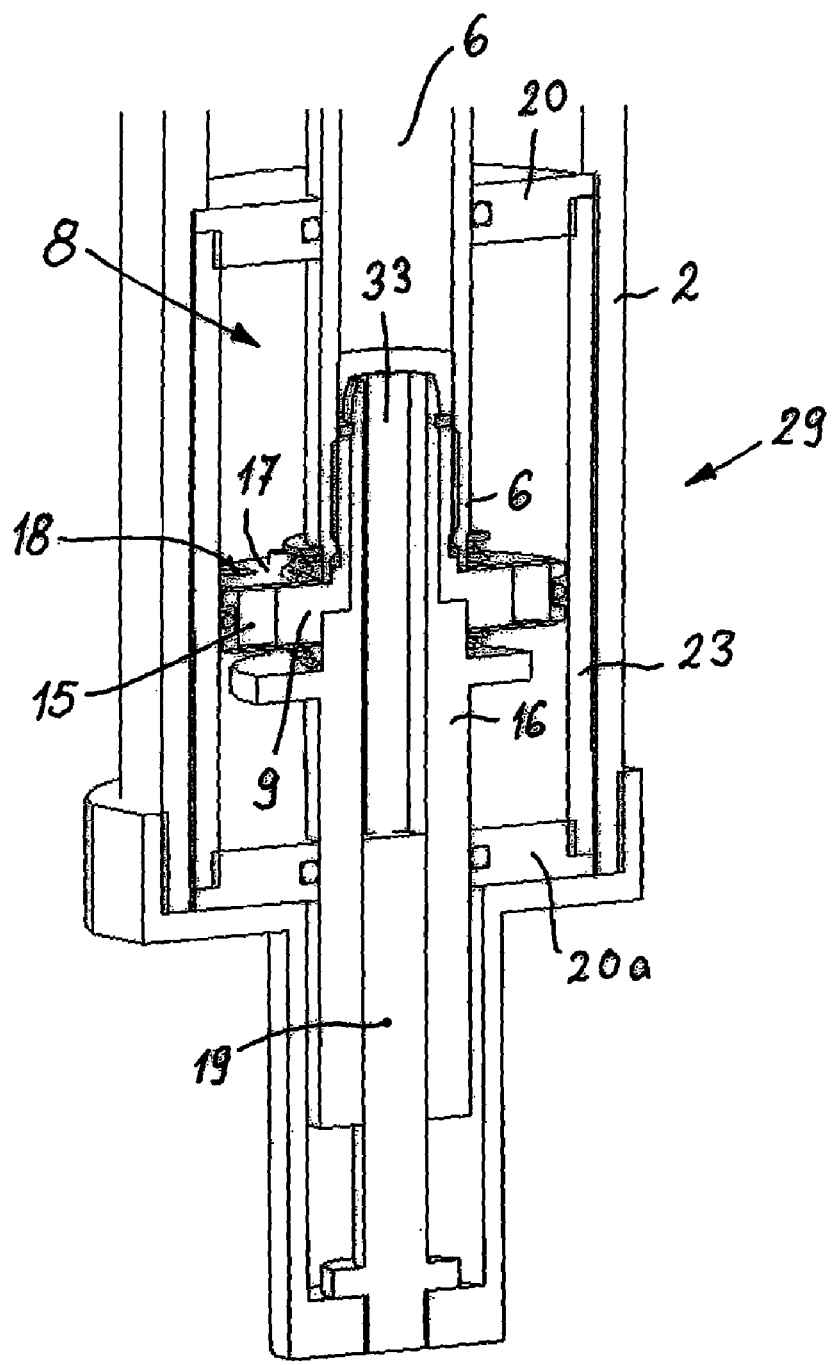
FIG. 6 is a perspective view of a telescopic leg in the area of the longitudinally cross-sectioned adjustment cylinder shown with an adjustment piston in the closed position.
Figure 7:
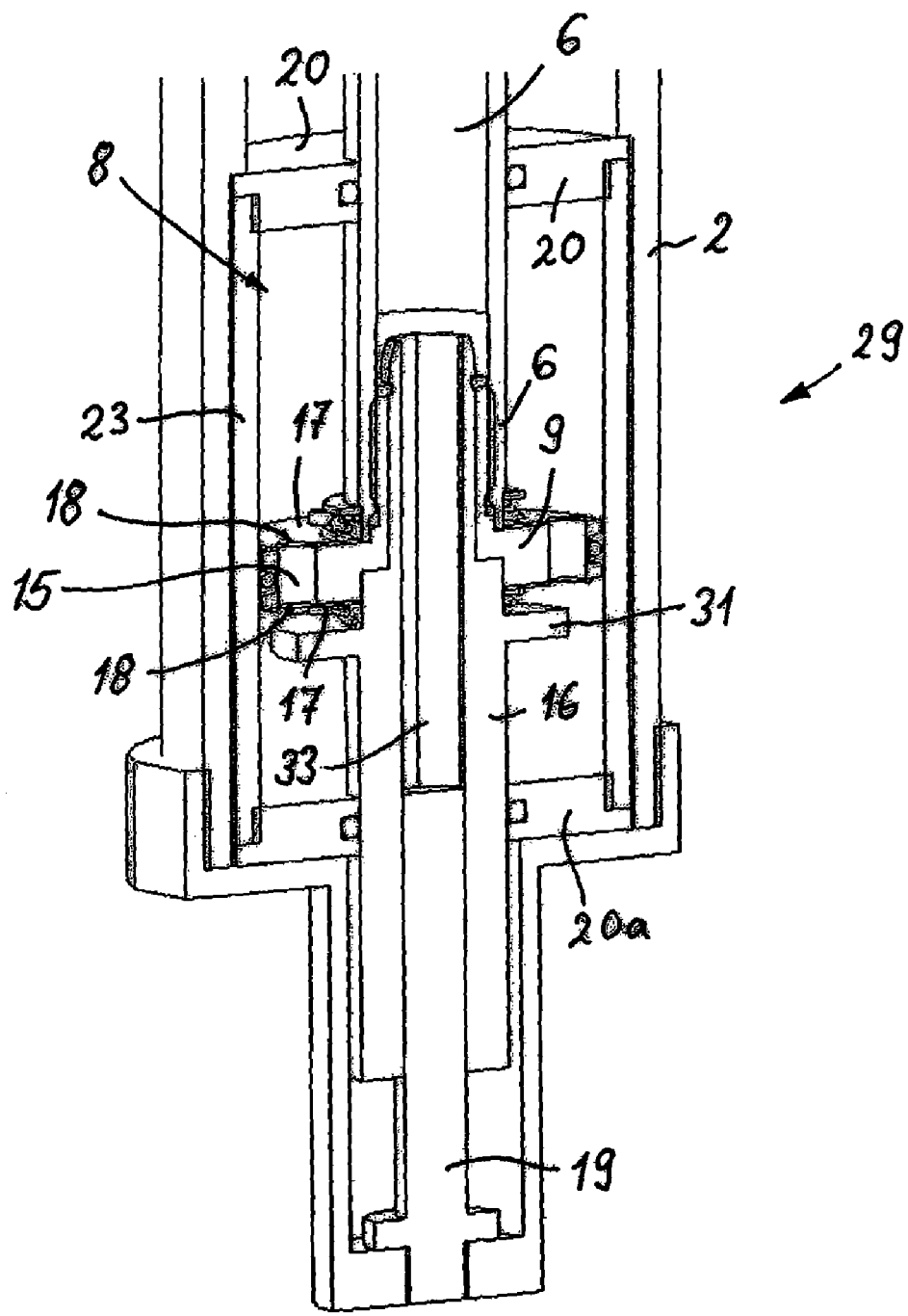
FIG. 7 is a perspective view of a telescopic leg in the area of the longitudinally cross-sectioned adjustment cylinder shown with an adjustment piston in the open position.

The perspective cross-section according to FIG. 6 shows the closed position of the adjustment piston 9. The opening 18 discernible at the upper adjustment disc 17 is here off-set in reference to the penetrating bore 15 of the rotary adjustment piston 9. In FIG. 7, the opening position of the openings 18 of the adjustment discs 17 and the penetrating bores 15 of the adjustment piston 9 aligned over top of each other are discernible.

In the exemplary embodiment, the adjustment cylinder 8 is a closed cartridge with an upper sealing lid 20 and a lower sealing lid 20a. The adjustment piston 9 is sealed in reference to the cylinder wall 23 by a sealing ring 22 located in a circular groove 21 such that an exchange of fluids between the two cylinder chambers 13, 14 can only occur when the connection channel is opened.

The upper sealing lid 20 is provided with a sealing penetrating opening 24 for the piston rod 6 and the lower sealing lid 20a with a sealing penetrating opening 25 for the rod-shaped holding element 16, so that the sealing cylinder represents a "closed system" in spite of penetrating function elements.

The adjustment piston 9 with the holding element 16 can be longitudinally displaced and is connected thereto in a rotational manner in reference thereto. The holding element 16 is connected in a torque-proof and longitudinally displaceable manner to the plunger tube 2 and/or the holding element 16. For this purpose, a multi-faceted rod 19 is connected with its lower end in a fixed manner to the plunger tube seal 30 and engages a multi-faceted interior space 33 of the holding element 16 extending longitudinally. This is guided through it, displaceable in the longitudinal direction, and torque proof. This way the adjustment discs 17 are held in the different lift positions of the adjustment piston 9 in a torque-proof manner as well.

The length of the multi-faceted pin 19 and the length of the lower end of the holding element 16 are adjusted to the predetermined adjustment travel of the adjustment piston 9 in order for both elements engaging in each lift position of the adjustment piston 9.

Figure 8:
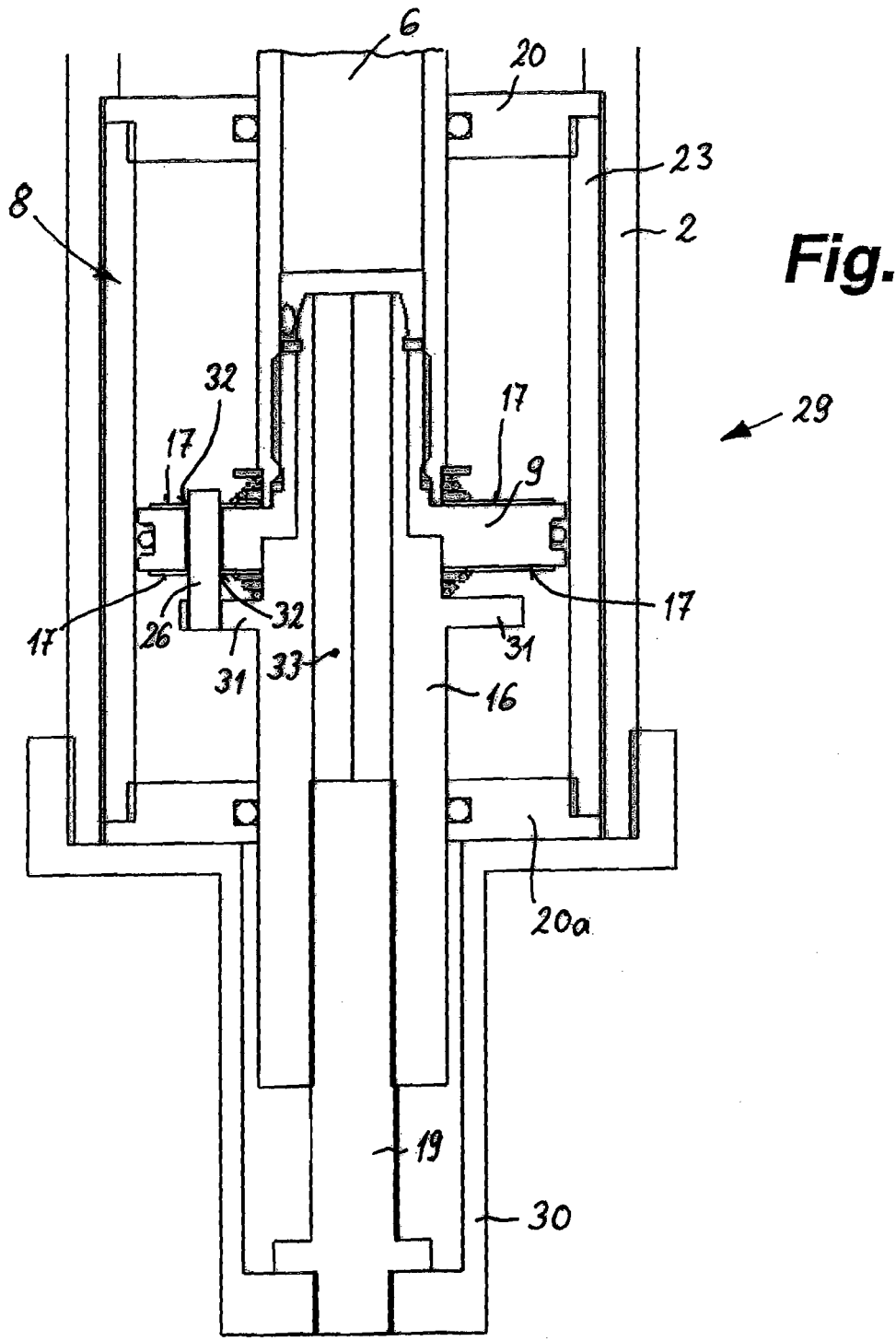
FIG. 8 is a longitudinal cross-sectional view through the adjustment cylinder with adjustment piston, adjustment discs, holding element, and holding pin.

In the longitudinal cross-section shown in FIG. 8 and rotated in reference to the other ones, a holding pin 26 is discernible, which is provided between the adjustment discs 17 and the holding element 16 for a torque-proof connection. The holding pin 26 is arranged at a flange 31 of the holding element 16. It engages the holes 32 of the adjustment discs 17 provided therefor and penetrates the adjustment piston 9 inside the partial perimeter slot provided in the piston 9, by which the rotation of the adjustment piston 9 is enabled in reference to the adjustment discs 17 connected to the holding pin 26.

The invention claimed is:

1. A telescopic fork (1) for two-wheelers, comprising a plunger tube (2) and a fixed tube (3) having a spring element (4), which is impinged by a piston (5) connected to the plunger tube (2), with the piston (5) having a piston rod (6) connected to the plunger tube (2), a piston rod (6) connected to the plunger tube (2), the piston rod (6) is adjustable in height, and an adjustment cylinder (8) is connected to the plunger tube (2), in which an adjustment piston (9) is connected to the piston rod (6) and the cylinder chambers (13, 14) located at both sides of the adjustment piston (9) are filled with a fluid, at least one connection channel is provided between the cylinder chambers that can be opened and closed for fluid to flow, the connection channel penetrates the adjustment piston (9), and the adjustment piston (9) is rotatable and adjustment discs (17) are arranged at both ends of the adjustment piston, connected to a holding element (16) in a torque-proof manner, each of the adjustment discs including at least one opening (18) that can be aligned to the connection channel (15) in the adjustment piston (9).

2. A telescopic fork according to claim 1, wherein the piston rod (6) is connected at a lower end section (7) thereof to the plunger tube (2).

3. A telescopic fork according to claim 2, wherein the lower end of the piston rod (6) can be adjusted in height.

4. A telescopic fork according to claim 1, wherein the piston rod (6) is connected in a torque-proof manner to the adjustment piston (9) as well as to a rotatable rod (10), which extends past an upper end of the telescopic leg (11) and is provided with a rotary control (12), and the adjustment piston (9) with the connection channel (15) can be aligned to the respective opening (18) in the adjustment discs (17) by rotating the rotary rod (10).

5. A telescopic fork according to claim 1, wherein the adjustment discs (17) connected in a torque proof manner to the holding element (16) are coupled to the adjustment piston (9), longitudinally displaceable by the adjustment piston (9), and connected torque-proof and longitudinally displaceable to the plunger tube (2) and/or an plunger tube seal (30).

6. A telescopic fork according to claim 1, wherein a holding pin (26) is provided for a torque-proof connection of the adjustment discs (17) and the holding element (16), which engage in holes (32) of the adjustment discs (17) and penetrate the adjustment piston (9) inside said at least one connection channel comprising a partial peripheral slot located in the piston (9).

7. A telescopic fork according to claim 1, wherein the adjustment discs (17) are biased towards the adjustment piston (9) by a spring.

8. A telescopic fork according to claim 1, wherein the adjustment cylinder (8) is embodied as a closed oil cartridge.

9. A telescopic fork according to claim 1, wherein the adjustment cylinder (8) is provided at both ends with sealing lids (20, 20a) each for sealing a penetrating opening (24) for the piston rod (6) and with a sealing penetrating opening (25) at a lower end for the rod-shaped holding element (16).

10. A telescopic element according to claim 1, wherein a length of a lower end of the rod-shaped holding element (16) is sized according to a maximally predetermined adjustment travel of the adjustment piston (9).

11. A telescopic fork according to claim 1, wherein the holding element (16) is provided with a multi-faceted interior cavity (33), extending in a longitudinal direction, and a multi-faceted rod (19) connected to the plunger tube (2) and/or a plunger tube lid and is displaceable, longitudinally guided inside an interior cavity thereof.

* * * * *